(12) United States Patent
Shu et al.

(10) Patent No.: US 9,515,780 B2
(45) Date of Patent: Dec. 6, 2016

(54) SHIFTING HARQ FEEDBACK FOR COGNITIVE-RADIO-BASED TD-LTE SYSTEMS

(75) Inventors: Kodo Shu, Beijing (CN); Haipeng Lei, Beijing (CN); Haitao Li, Beijing (CN); Honglin Hu, Shanghai (CN); Rui Wang, Shanghai (CN); Huiyue Yi, Shanghai (CN)

(73) Assignee: Nokia Technologies Oy, Espoo (FI)

( * ) Notice: Subject to any disclaimer, the term of this patent is extended or adjusted under 35 U.S.C. 154(b) by 14 days.

(21) Appl. No.: 14/366,059

(22) PCT Filed: Dec. 23, 2011

(86) PCT No.: PCT/CN2011/084538
§ 371 (c)(1),
(2), (4) Date: Jun. 17, 2014

(87) PCT Pub. No.: WO2013/091239
PCT Pub. Date: Jun. 27, 2013

(65) Prior Publication Data
US 2014/0362798 A1    Dec. 11, 2014

(51) Int. Cl.
*H04W 4/00* (2009.01)
*H04L 1/18* (2006.01)

(52) U.S. Cl.
CPC ........... *H04L 1/1861* (2013.01); *H04L 1/1854* (2013.01); *H04L 1/1812* (2013.01)

(58) Field of Classification Search
None
See application file for complete search history.

(56) References Cited

U.S. PATENT DOCUMENTS

| 9,184,882 | B2* | 11/2015 | Adjakple | H04L 1/1887 |
| 2005/0249120 | A1* | 11/2005 | Heo | H04L 1/0007 370/236 |
| 2008/0080465 | A1* | 4/2008 | Pajukoski | H04L 1/0016 370/342 |

(Continued)

FOREIGN PATENT DOCUMENTS

| CN | 102246575 A | 11/2011 |
| WO | 2010/017338 A2 | 6/2010 |
| WO | 2011/146539 A1 | 11/2011 |

OTHER PUBLICATIONS

International Search Report and Written Opinion received for corresponding Patent Cooperation Treaty Application No. PCT/CN2011/084538, dated Oct. 4, 2012, 13 pages.

(Continued)

*Primary Examiner* — Otis L Thompson, Jr.
(74) *Attorney, Agent, or Firm* — Harrington & Smith (57) ABSTRACT

A method includes, in response to a determination one or more quiet periods conflict with specified hybrid automatic repeat request feedback timing, sending one or more indicators to one or more user equipment to indicate to the user equipment to shift the specified hybrid automatic repeat request feedback timing to a shifted hybrid automatic repeat request feedback timing. The method includes communicating hybrid automatic repeat request feedback based on the shifted hybrid automatic repeat request feedback timing. Another method includes receiving at a user equipment one or more indicators indicating to the user equipment to shift specified hybrid automatic repeat request feedback timing to a shifted hybrid automatic repeat request timing, and communicating hybrid automatic repeat request feedback based on the shifted hybrid automatic repeat request timing. Apparatus, computer program product, and computer programs are also disclosed.

20 Claims, 8 Drawing Sheets

(56) References Cited

U.S. PATENT DOCUMENTS

| | | | |
|---|---|---|---|
| 2009/0235139 A1* | 9/2009 | Park | H04L 1/1819 714/750 |
| 2009/0323620 A1* | 12/2009 | Kim | H04L 1/1887 370/329 |
| 2010/0042884 A1* | 2/2010 | Kuo | H04W 52/48 714/748 |
| 2010/0195501 A1* | 8/2010 | Tynderfeldt | H04W 28/18 370/235 |
| 2010/0290420 A1 | 11/2010 | Dalsgaard et al. | |
| 2010/0316008 A1* | 12/2010 | Kim | H04L 1/1896 370/329 |
| 2011/0069720 A1* | 3/2011 | Jacobs | H04H 60/41 370/466 |
| 2011/0130101 A1* | 6/2011 | Jung | H04W 16/14 455/73 |
| 2012/0039260 A1* | 2/2012 | Song | H04L 1/0045 370/328 |
| 2012/0127897 A1* | 5/2012 | Xu | H04L 1/1887 370/279 |
| 2012/0195284 A1* | 8/2012 | Mann | H04W 28/16 370/329 |
| 2013/0083708 A1* | 4/2013 | Lin | H04L 5/14 370/280 |
| 2013/0308464 A1* | 11/2013 | Park | H04W 72/0406 370/241 |

OTHER PUBLICATIONS

ETSI TR 103 67 V0.0.4 *Reconfigurable Radio Systems (RRS); Feasibility Study on Radio Frequency (RF) Performances for Cognitive Radio Systems Operating in UHF TV Band White Spaces* (Sep. 2011).

3GPP TSG-RAN WG1 Meeting #67 *Discussion on HARQ Feedback Mechanism and Cross-Carrier Scheduling in Inter-Band CA with Different TDD UL-DL Configurations* San Francisco, USA, Nov. 14-18, 2011 R1-113864.

IEEE P802.22b/D1.0 Draft Standard for Wireless Regional Area Networks Part 22: Cognitive Wireless RAN Medium Access Control (MAC) and Physical Layer (PHY) Specifications: Policies and Procedures for Operation in the TV Bands-Amendment: Enhancement for Broadband Services and Monitoring Applications.

3GPP TS 36.213 V10.3.0 *$3^{rd}$ Generation Partnership Project; Technical Specification Group Radio Access Network; Evolved Universal Terrestrial Radio Access (E-UTRA); Physical Layer Procedures* (Release 10).

* cited by examiner

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | - | - | - | - | - | - | - | - | - | - |
| 1 | - | - | 6 | - | 4 | - | - | 6 | - | 4 |
| 2 | - | - | 7, 6 | 4 | - | - | - | 7, 6 | 4 | - |
| 3 | - | - | 8, 7, 4, 6 | - | - | - | - | 8, 7, 4, 6 | - | - |
| 4 | - | - | 7, 6, 11 | 6, 5 | 5, 4 | - | - | - | - | - |
| 5 | - | - | 12, 8, 7, 11 | 6, 5, 4, 7 | - | - | - | - | - | - |
| 6 | - | - | 13, 12, 9, 8, 7, 5, 4, 11, 6 | - | 5 | - | - | 7 | 7 | - |

FIG. 4

| TDD UL/DL Configuration | subframe index n | | | | | | | | | |
|---|---|---|---|---|---|---|---|---|---|---|
| | 0 | 1 | 2 | 3 | 4 | 5 | 6 | 7 | 8 | 9 |
| 0 |   |   | 4 | 7 | 6 |   |   | 4 | 7 | 6 |
| 1 |   |   | 4 | 6 | 6 |   |   | 4 | 6 |   |
| 2 |   |   | 6 |   |   |   |   | 6 |   |   |
| 3 |   |   | 6 | 6 | 6 |   |   |   |   |   |
| 4 |   |   | 6 | 6 |   |   |   |   |   |   |
| 5 |   |   | 6 |   |   |   |   |   |   |   |
| 6 |   |   | 4 | 6 | 6 |   |   | 4 | 7 |   |

SHIFTING HARQ FEEDBACK FOR COGNITIVE-RADIO-BASED TD-LTE SYSTEMS

RELATED APPLICATION

This application was originally filed as Patent Cooperation Treaty Application No. PCT/CN2011/084538 filed Dec. 23, 2011.

TECHNICAL FIELD

This invention relates generally to wireless networks and, more specifically, relates to use of unlicensed bands by the wireless network.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The following abbreviations that may be found in the specification and/or the drawing figures are defined as follows:
ACK acknowledgement
ARQ automatic repeat request
BCH broadcast channel
BS base station
CR cognitive radio
DL (or D) downlink (from base station to UE)
DwPTS downlink pilot timeslot
GP guard period
HARQ hybrid automatic repeat request
LTE long term evolution
NACK non-acknowledgement
PDCCH physical downlink control channel
PDSCH physical downlink shared channel
PHICH physical hybrid ARQ indicator channel
PUCCH physical uplink control channel
PUSCH physical uplink shared channel
QP quiet period
RAN radio area network
S sensing
SCH synchronization channel
SPS semi-persistent scheduling
TDD time division duplexing
TD-LTE time division-LTE
TV television
TVWS television whitespace
UE user equipment
UL (or U) uplink (from UE to base station)
UpPTS uplink pilot timeslot
WLAN wireless local area network Recent expansion in wireless traffic volume and corresponding bandwidth scarcity will require network operators to continue increasing their wireless capacity. One promising technique is to use license-exempt frequency spectrum, sometimes also termed unlicensed band(s) or shared band(s). Examples of such license exempt bands include the ISM (industrial, scientific and medical) band in which IEEE 802.11 type networks (hereafter, WLAN) currently operate, and also what is known as television whitespaces (TVWSs), which is a very large amount of spectrum. Using this frequency spectrum is not a simple task in that, since the spectrum is license exempt, the spectrum will be in simultaneous use by different users operating according to different RATs (radio access technologies) such as LTE and WLAN.

Cognitive radio (CR) has received considerable research impetus because of its ability to efficiently utilize the unused "spectrum holes" in unlicensed bands without causing severe interference to primary users, and also to help solve the bandwidth scarcity problem and achieve higher data rates. Additionally, CR could be implemented to solve some coexistence issues by sensing surrounding radio environment and determining the optimal communication scheme to avoid interference.

However, deploying a network capable of cognitive radio is a difficult task.

SUMMARY

In an exemplary embodiment, an apparatus is disclosed that includes one or more processors and one or more memories including computer program code. The one or more memories and the computer program code are configured to, with the one or more processors, cause the apparatus to perform at least the following: in response to a determination one or more quiet periods conflict with specified hybrid automatic repeat request feedback timing, sending one or more indicators to one or more user equipment to indicate to the user equipment to shift the specified hybrid automatic repeat request feedback timing to a shifted hybrid automatic repeat request feedback timing; and communicating hybrid automatic repeat request feedback based on the shifted hybrid automatic repeat request feedback timing.

In a further exemplary embodiment, a computer program is disclosed that includes: code for, in response to a determination one or more quiet periods conflict with specified hybrid automatic repeat request feedback timing, sending one or more indicators to one or more user equipment to indicate to the user equipment to shift the specified hybrid automatic repeat request feedback timing to a shifted hybrid automatic repeat request feedback timing; and code for communicating hybrid automatic repeat request feedback based on the shifted hybrid automatic repeat request feedback timing, when the computer program is run on a processor.

In an additional exemplary embodiment, a method is disclosed that includes: in response to a determination one or more quiet periods conflict with specified hybrid automatic repeat request feedback timing, sending one or more indicators to one or more user equipment to indicate to the user equipment to shift the specified hybrid automatic repeat request feedback timing to a shifted hybrid automatic repeat request feedback timing; and communicating hybrid automatic repeat request feedback based on the shifted hybrid automatic repeat request feedback timing.

A further exemplary embodiment discloses and apparatus comprising: means, responsive to a determination one or more quiet periods conflict with specified hybrid automatic repeat request feedback timing, for sending one or more indicators to one or more user equipment to indicate to the user equipment to shift the specified hybrid automatic repeat request feedback timing to a shifted hybrid automatic repeat request feedback timing; and means for communicating hybrid automatic repeat request feedback based on the shifted hybrid automatic repeat request feedback timing.

In another exemplary embodiment, an apparatus includes one or more processors and one or more memories including computer program code. The one or more memories and the computer program code are configured to, with the one or more processors, cause the apparatus to perform at least the following: receiving at a user equipment one or more indicators indicating to the user equipment to shift specified hybrid automatic repeat request feedback timing to a shifted hybrid automatic repeat request timing; and communicating hybrid automatic repeat request feedback based on the shifted hybrid automatic repeat request timing.

In an additional exemplary embodiment, a computer program includes: code for receiving at a user equipment one or more indicators indicating to the user equipment to shift specified hybrid automatic repeat request feedback timing to a shifted hybrid automatic repeat request timing; and code for communicating hybrid automatic repeat request feedback based on the shifted hybrid automatic repeat request timing, when the computer program is run on a processor.

Yet another exemplary embodiment includes a method including: receiving at a user equipment one or more indicators indicating to the user equipment to shift specified hybrid automatic repeat request feedback timing to a shifted hybrid automatic repeat request timing; and communicating hybrid automatic repeat request feedback based on the shifted hybrid automatic repeat request timing.

In another exemplary embodiment, an apparatus is disclosed that includes: means for receiving at a user equipment one or more indicators indicating to the user equipment to shift specified hybrid automatic repeat request feedback timing to a shifted hybrid automatic repeat request timing; and means for communicating hybrid automatic repeat request feedback based on the shifted hybrid automatic repeat request timing.

DETAILED DESCRIPTION OF THE DRAWINGS

Figure 1:
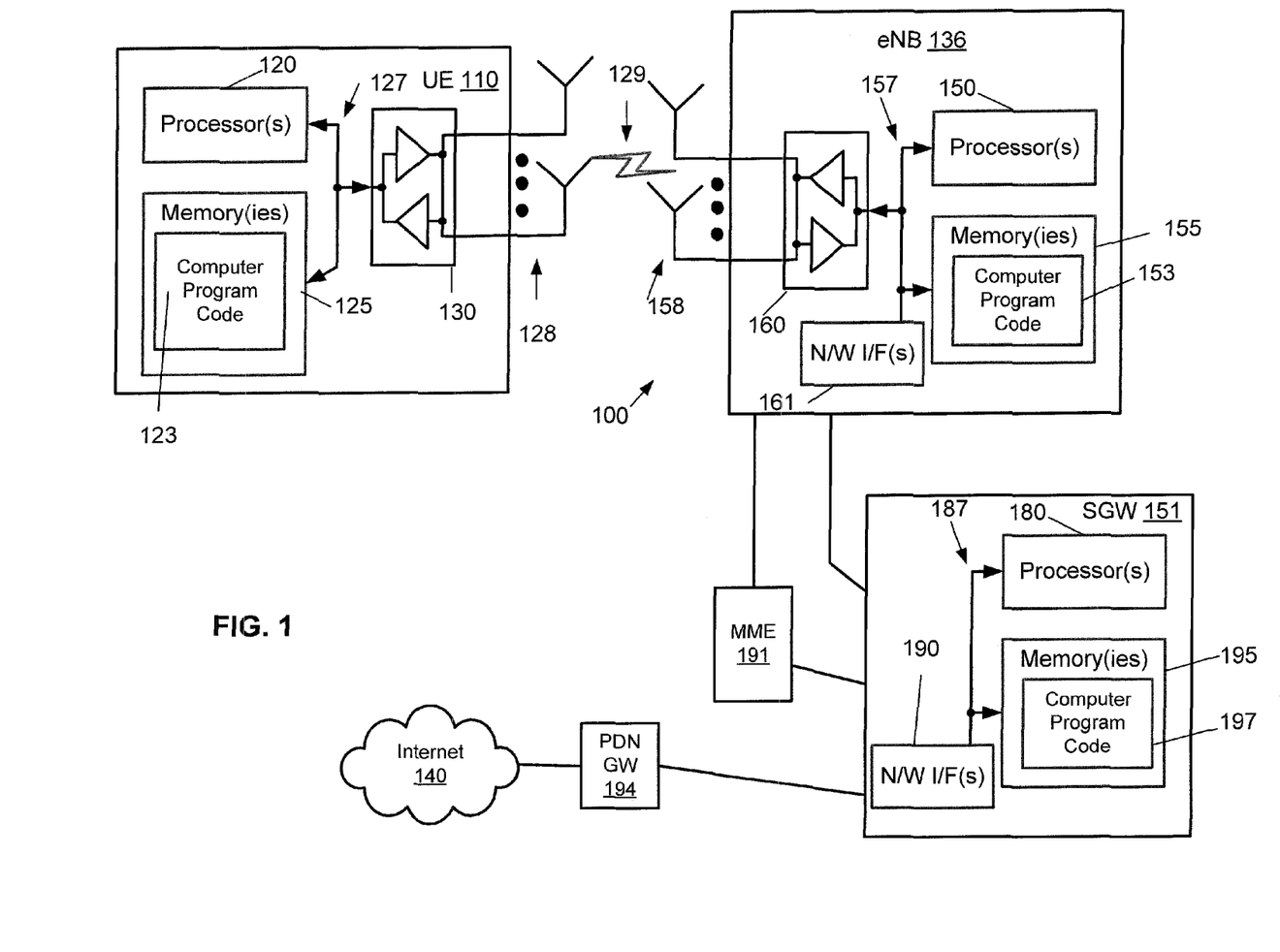
FIG. 1 illustrates a block diagram of an exemplary system in which the instant invention may be used.

Before proceeding with additional description of exemplary techniques for shifting HARQ feedback for cognitive-radio-based TD-LTE systems and problems with conventional techniques, exemplary systems are described in which the present invention might be used. For instance, FIG. 1 illustrates a block diagram of an exemplary system in which the instant invention may be used. In FIG. 1, a UE 110 is in wireless communication via wireless link 129 with the evolved Node B (eNB) 136, which is a base station in LTE. A wireless network 100 comprises in this example the eNB 136, a serving gateway (SGW) 151, a mobility management entity (MME) 191, and a packet data network (PDN) gateway (GW) 194. The wireless network 100 is coupled to another network (e.g., the Internet 140) via the PDN GW 194. A RAN includes the eNB 136, and a core network includes the SGW 151, MME 191, and PDN GW 194.

The UE 110 comprises one or more processors 120, one or more memories 125, and one or more transceivers 130, interconnected through one or more buses 127. The one or more transceivers 130 are connected to one or more antennas 128. The one or more memories 125 comprise computer program code 123. The one or more memories 125 and the computer program code 123 are configured, with the one or more processors 120, to cause the UE 110 to perform one or more of the operations described herein.

The eNB 136 comprises one or more processors 150, one or more memories 155, one or more network interfaces (N/W I/F(s)) 161, and one or more transceivers 160, interconnected through one or more buses 157. The one or more transceivers 160 are connected to one or more antennas 158. The one or more memories 155 comprise computer program code 153. The one or more memories 155 and the computer program code 153 are configured, with the one or more processors 150, to cause the eNB 136 to perform one or more of the operations described herein.

The SGW 151 comprises one or more processors 180, one or more memories 195, and one or more network interfaces (N/W I/F(s)) 190, interconnected through one or more buses 187. The one or more memories 195 comprise computer program code 197. The one or more memories 195 and the computer program code 197 are configured, with the one or more processors 180, to cause the SGW 151 to perform one or more of the operations described herein.

The network interfaces 161, 190 provide access to other elements in the network 100, e.g., using various interfaces as is known. For example, the interface between the eNB 136 and the SGW 151 may include an S1 interface, as might the interface between the eNB 136 and the MME 191. The interface between the MME 191 and the SGW 151 may include an S11 interface, and the interface between the PDN GW 194 and the SGW 151 might include S5/S8 interfaces.

The various embodiments of the UE 110 can include, but are not limited to, cellular telephones, smart phones, M2M devices, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. The UE 110 may also be referred to by other names, such as a mobile device.

The memories 125, 155, and 195 may be of any type suitable to the local technical environment and may be implemented using any suitable data storage technology, such as semiconductor based memory devices, magnetic memory devices and systems, optical memory devices and systems, fixed memory and removable memory. The processors 120, 150, and 180 may be of any type suitable to the local technical environment, and may include one or more of general purpose computers, special purpose computers, microprocessors, digital signal processors (DSPs) and processors based on a multi-core processor architecture, as non limiting examples.

Figure 2:
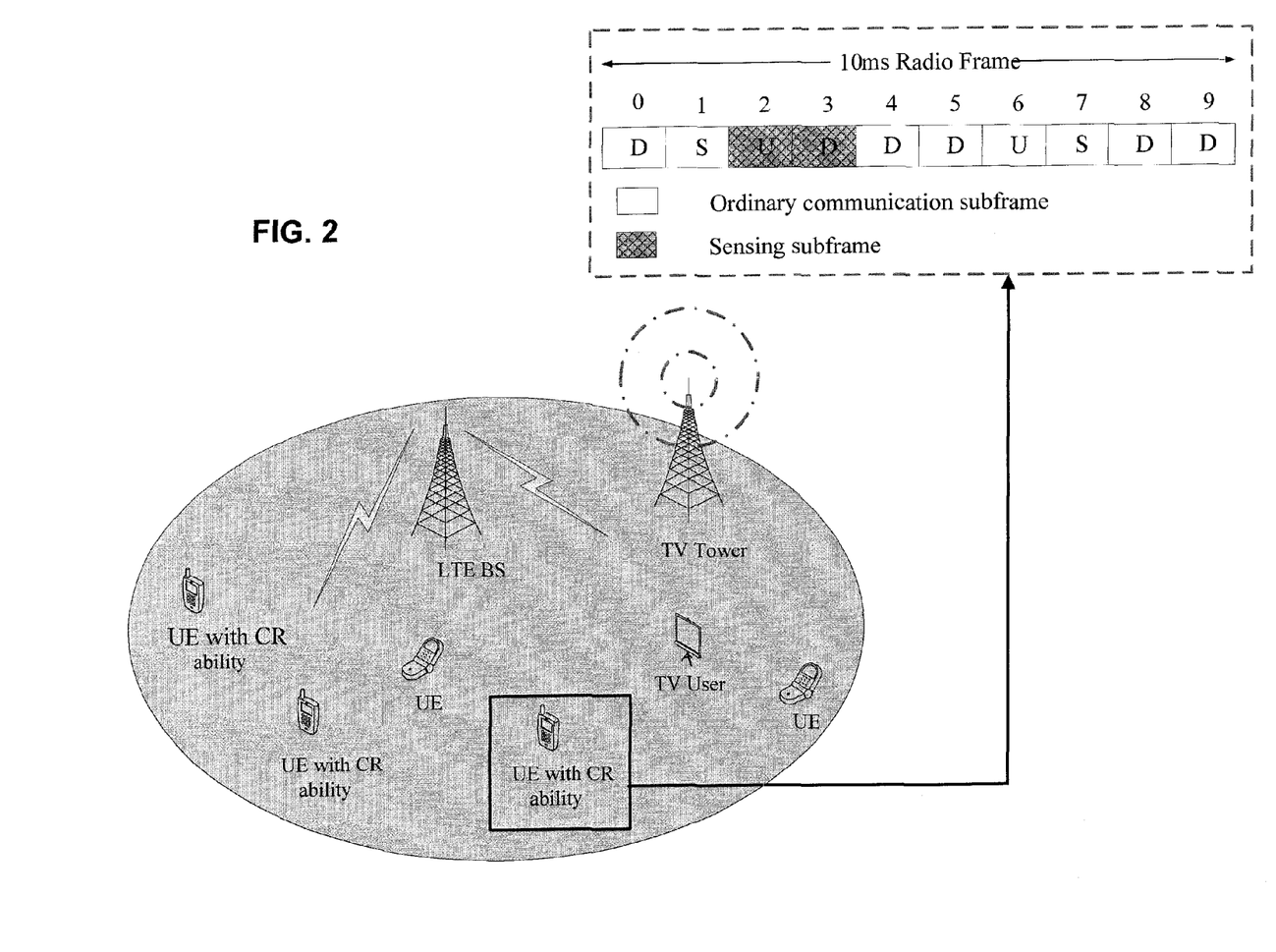
FIG. 2 illustrates a cognitive TD-LTE network deployment using TV white space.

Returning to examples of certain problems associated with deploying a network capable of cognitive radio, many conventional theoretical and industry efforts have been made to work with real-world experimental deployments of cognitive radio networks. For example, the IEEE 802.22 standard is proposed for Wireless Regional Area Network (WRAN) using white spaces in the TV frequency spectrum permitted by the FCC (federal communication commission). Recently, some research focused on incorporating CR features into LTE systems with no or minimal change to existing LTE system architecture. Previous work proposed UEs organized by a base station (BS) to sense a target spectrum periodically by occupying one or more subframes for cognitive spectrum sensing. FIG. 2 provides an illustration of a cognitive TD-LTE network deployment using TV white space, where the UEs 110 with CR capability should sense the TV band periodically. A base station (e.g., LTE BS) may want to take subframes 2 and 3 of the 10 ms (millisecond) radio frame for sensing subframes. However, these spectrum sensing methods may bring some problems, such as HARQ-ACK (ACK/NACK) loss (since HARQ-ACK may be transmitted on uplink in subframe 2 or received on downlink in subframe 3), which requires careful consideration.

As specified in 3GPP TS 36.213, after a UE 110 has performed the uplink (UL) transmission on the physical uplink shared channel (PUSCH), the UE 110 stands by for HARQ feedback information reception on PHICH (physical hybrid-ARQ indicator channel) or for an UL grant from the base station 136. Similarly, after the UE 110 has received the downlink (DL) transmission on physical downlink shared channel (PDSCH), the UE 110 should feedback the corresponding HARQ-ACK on the UL subframe. If HARQ-ACK for the UL data is not received, the UE 110 retransmits the data in a retransmission TTI (transmission time interval). In the same way, if HARQ-ACK for the DL data is not transmitted by the UE 110, the BS 136 should retransmit the DL data.

Figure 3:
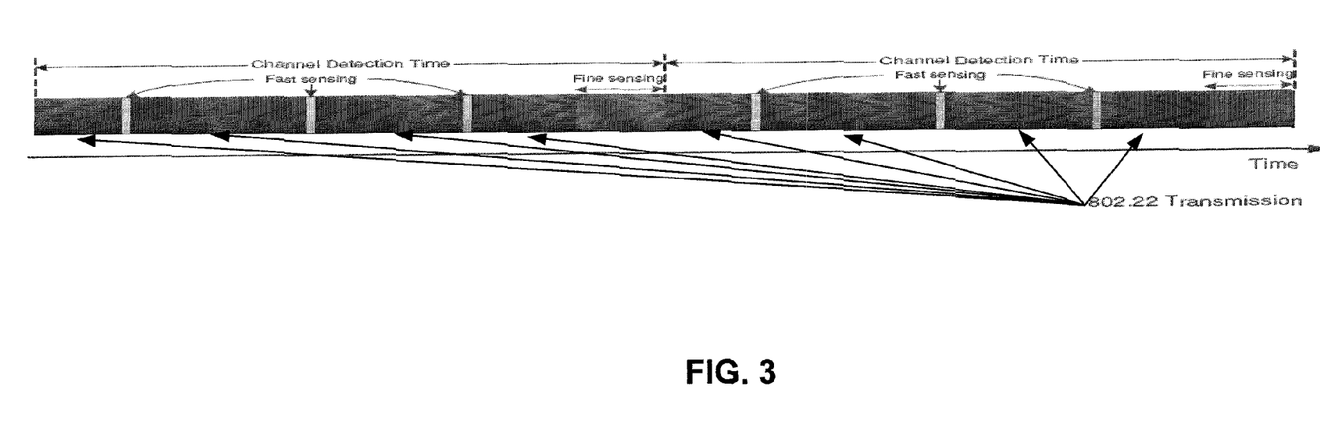
FIG. 3 illustrates a structure of two-stage mechanism for quiet period management.

In a cognitive network, in order to protect primary users (the TV users in this example), a second system (in this example, the LTE system and its stations) needs to perform in-band spectrum sensing, i.e., the stations (e.g., BSs and UEs) sense the same channels used for normal cell operation. For in-band spectrum sensing, the second system detects the presence of the primary system and immediately withdraws a working channel occupied by primary system. Typically, quiet periods (QPs) are required, during which all network traffic is suspended and stations sense the channel(s) in order to find out whether the primary users are present. For instance, the spectrum sensing scheme in the IEEE 802.22 standard requires network-wide QPs (always tens of milliseconds). FIG. 3 shows a mechanism for quiet period management, where the second system is quiet in both of fast sensing stages and fine sensing stages.

Naturally, the QP management is used for incorporating CR features into the TD-LTE networks. For example, in the research of Beijing University of Posts & Telecommunications, a TD-LTE system capable of CR features was built in which the BS 136 is able to set up an exclusive time duration for spectrum sensing called the quiet period (QP) in order to obtain available unlicensed spectrum. That is, setting up the QPs is intended for the sensing. If sensing results show the spectrum is unoccupied, then an LTE system can obtain this spectrum for cell operation. For a BS 136, the BS 136 should send a sensing instruction via a physical downlink control channel (PDCCH), containing targeted spectrum, sensing time, sensing methods, and so on. For UEs 110, after receiving a sensing instruction from the BS 136, the UEs 110 stop current transmissions and start sensing the spectrum band indicated by BS 136. Thus, in the QP for spectrum sensing, the communications between BSs 136 and UEs 110 are interrupted in the general timeline. In this case, if the QP for spectrum sensing conflicts with the HARQ feedback timing, it is impossible for UEs 110 to receive or transmit HARQ feedback, which will cause unnecessary retransmission due to no feedback from the transmitter. This situation is referred to herein as the HARQ-ACK loss issue.

For the time being, there has not been much research to solve the HARQ-ACK loss issues discussed above. The common approach is discarding the HARQ feedback when the QP for spectrum sensing conflicts with the HARQ feedback timing. In this case, unnecessary retransmission will happen, and also this approach leads to a waste of system resources.

Figure 6:
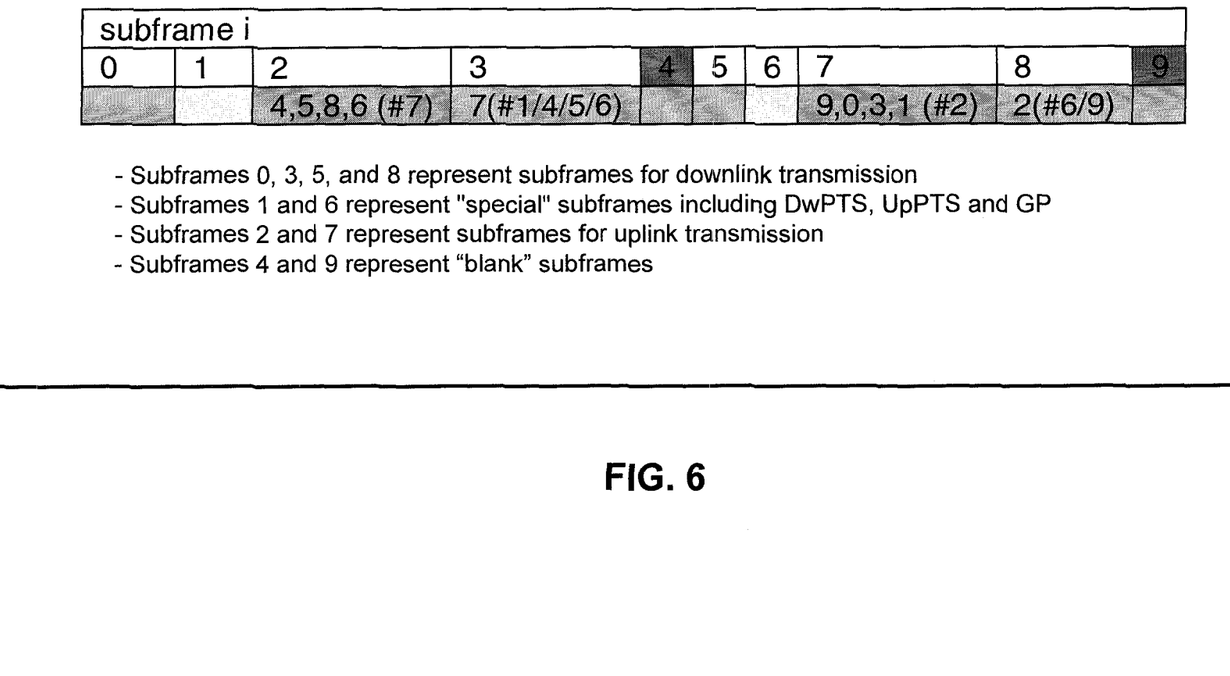
FIG. 6 is an illustration of HARQ timing shifting for TDD UL/DL configuration 2 with CR enabled.

In certain TDD UL/DL configurations for TD-LTE, there are some 'blank' subframes where no HARQ feedback or UL grant is carried. For example, as shown in FIG. 6, subframes number 4 and 9 are blank. Note that in TDD UL/DL configurations, BCH, SCH and paging, etc, are transmitted on subframes of #0, #1, #5, #6, so these subframes should not be used for cognitive spectrum sensing. A straightforward approach is to seek these 'blank' subframes to perform spectrum sensing. However, this approach is limited by the TDD UL/DL configurations, as there is no 'blank' subframe in TDD UL/DL configurations 1 and 6. Furthermore, the number of available 'blank' subframes is not always enough to satisfy the requirements of sensing time.

In summary, a more flexible and reliable approach is needed to solve the HARQ-ACK loss issues.

Before proceeding with additional description of exemplary embodiments, it is helpful to discuss terminology. The term HARQ means a procedure for data transmission and the corresponding ACK/NACK feedback (and subsequent retransmission of the data in case of receiving NACK feedback), such as a combination of high-rate forward error-correcting coding and ARQ error-control for detectable-but-uncorrectable errors. The term "HARQ-ACK" is equivalent to the terms "HARQ feedback" or "ACK/NACK". That is, this is the actual feedback associated with the HARQ procedure. HARQ feedback is the concrete information (ACK or NACK) corresponding to data transmission. Herein, shifting the timing of the HARQ feedback is proposed. And the information being sent/received in the shifted timing is the HARQ feedback.

For the HARQ-ACK loss issues mentioned above, a HARQ-ACK shifting scheme is proposed in an exemplary embodiment as follows:

1. When a BS 136 needs to organize UEs 110 to sense unlicensed spectrum, the BS 136 chooses subframes to be occupied as QP for spectrum sensing, and decides whether the QP conflicts with the HARQ feedback timing. If the QP conflicts with the HARQ feedback timing corresponding to the previous subframes, the BS 136 shall shift the corresponding HARQ feedback to another subframe. Then, the BS 136 indicates to the UEs 110 a sensing instruction, which includes an indicator of the new timing where HARQ feedback is shifted.

2. The indicator can be generated in the two following exemplary options, although other options are possible:

2a.—Option 1:

Using an offset value to indicate the offset to which the new HARQ feedback timing is moved.

2b. Option 2:

When the cognitive radio based TD-LTE system is set up, BS 136 and UEs 110 will make an agreement on the potential mapping relationship in each case that spectrum sensing QP overlaps the HARQ feedback timing. If the BS 136 intends to assign a QP for spectrum sensing, the BS 136 informs the UEs 110 of the selected mapping relationship Formularized, e.g., as a mapping type.

Figure 4:
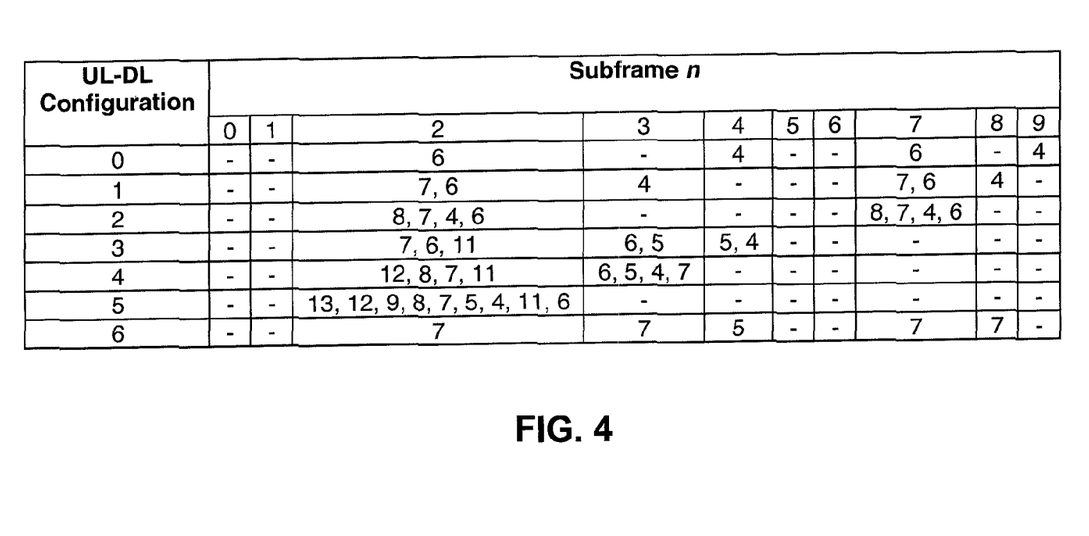
FIG. 4 is a table illustrating a downlink association set index K: $\{k_0, k_1, \ldots, k_{M-1}\}$ for TDD.

As specified in 3GPP TS 36.213, for TDD, the UE 110 shall upon detection of a PDSCH transmission or a PDCCH indicating downlink SPS release within subframe(s) n−k, where k∈K and K is defined in the table shown in FIG. 4, transmit the HARQ-ACK response in UL subframe n. That is, FIG. 4 shows a table illustrating a downlink association set index K: $\{k_0, k_1, \ldots, k_{M-1}\}$ for TDD. It should be noted that n−k may produce a negative value. For instance, for subframe 2 in FIG. 4 for the UL-DL configuration 2, the downlink association set index is $\{8, 7, 4, 6\}$. Taking n−k for this subframe and configuration yields the set $\{-6, -5, -2, -4\}$ (i.e., n is 2 and the first value in this set is 2−8=−6). That is, the subframes in this set of "negative" numbers are from the previous frame (e.g., frame j−1 if the current frame is j). One way to think about this is if one starts at subframe 2 in a current frame and goes backwards 8 subframes from subframe 2 in the current frame and into the previous frame, one ends at subframe 6 in the previous subframe, Using this math, the set $\{-6, -5, -2, -4\}$ is $\{4, 5, 8, 6\}$ (the latter is shown in subframe 2 of FIG. 6).

Figure 5:
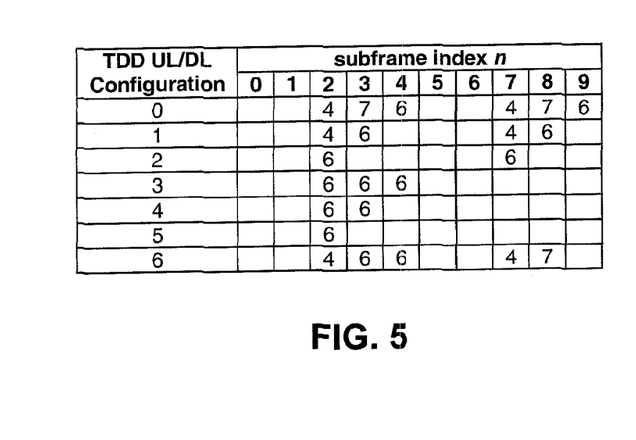
FIG. 5 is a table illustrating $k_{PHICH}$ for TDD.

Accordingly, for PUSCH transmissions scheduled from serving cell c in subframe n, a UE 110 shall determine the corresponding PHICH resource of serving cell c in subframe $n+k_{PHICH}$, where $k_{PHICH}$ for TDD is given in the table shown in FIG. 5.

For ease of understanding, in the following, these two tables are combined into one, so that the timing for reporting HARQ-ACK and receiving PHICH by a UE 110 can be stated simultaneously. As shown in FIG. 6, taking TDD UL/DL configuration 2 as an example, the HARQ timing of TDD UL/DL configuration 2 according to 3GPP TS 36.213 is given, where the information in UL subframe i represent DL subframes i−k whose HARQ-ACKs are transmitted on uplink subframe i, and the information in DL subframe i represents UL subframes $i-k_{PHICH}$ whose corresponding PHICH should be responded in DL subframe i. For example, "4,5,8,6" in the column of subframe #2 indicates that the PDSCH or PDCCH indicating DL SPS release transmitted on subframe i-8, i-7, i-4, i-6 (i=2), after the UE 110 receives these downlink subframes, the UE 110 shall send the corresponding HARQ-ACK in UL subframe i. The information '7' in parentheses instructs the UE 110 that the HARQ feedback for subframes "4,5,8,6" can be shifted to UL subframe #7 with the UL grant adjusted together (i.e., the PUSCH transmission scheduled in current uplink subframe by UL grant i shall also be shifted). Similarly, '7' in the column of DL subframe #3 indicates that the corresponding HARQ feedback of UL subframe $k_{PHICH}$ (i=3, $k_{PHICH}$=6) will be received in DL subframe i via PHICH, followed by "#1/4/5/6" in parenthesis instructing the UE 110 that the HARQ-ACK of subframe #7 can be shifted to one of DL subframes #1 or #4 or #5 or #6.

Figure 7:
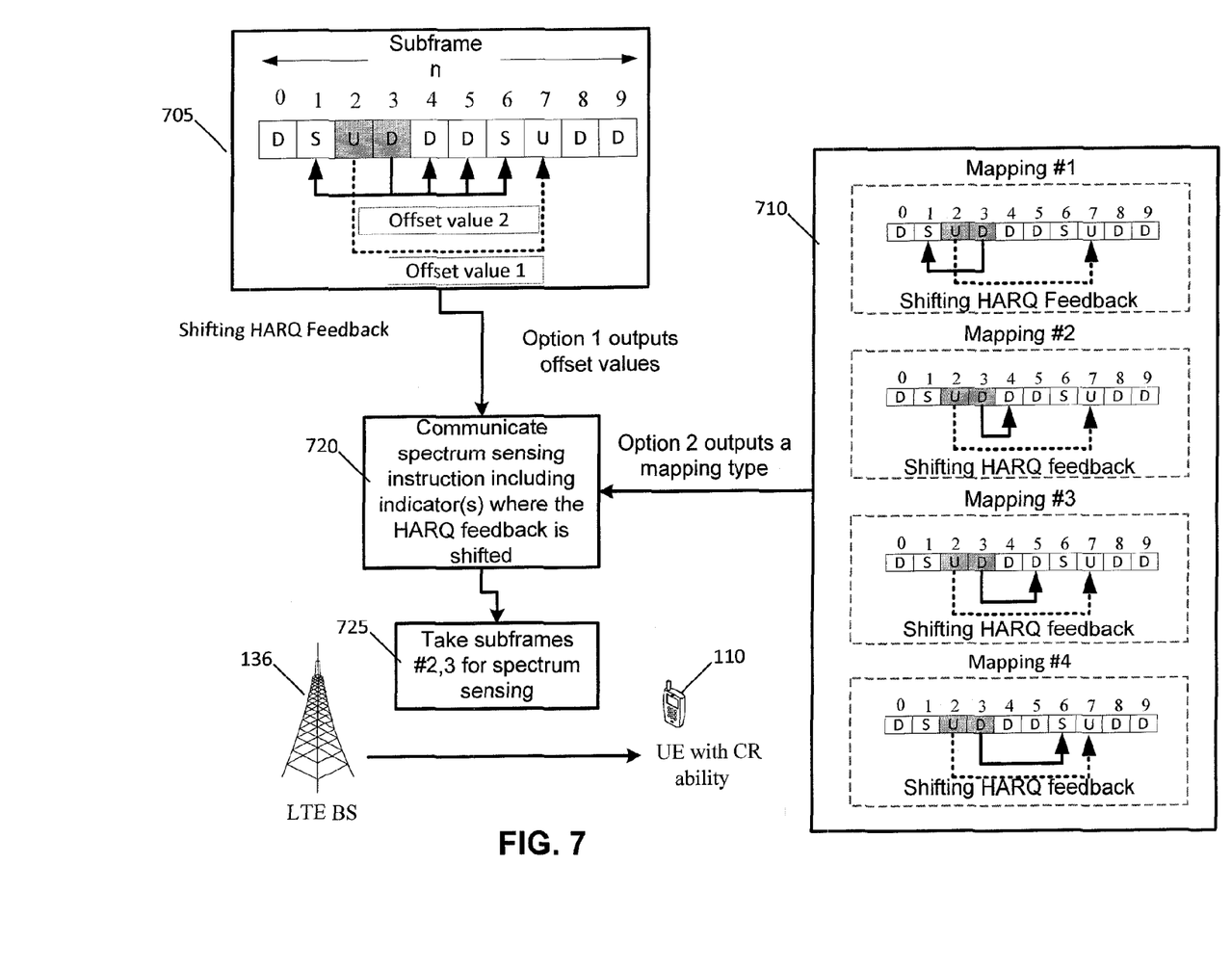
FIG. 7 illustrates two implementation options for HARQ shifting.

The present invention provides techniques that use one or more indicators to indicate the shifting of HARQ feedback timing. FIG. 7 shows an exemplary procedure that an LTE BS uses to schedule one or more QPs for cognitive spectrum sensing and illustrates two exemplary implementation options of generating the indicator(s).

In a cognitive TD-LTE system working in TDD UL/DL configuration 2 as mentioned above, a BS 136 chooses subframes #2 and #3 as the QPs for spectrum sensing. Because the QP conflicts with the currently specified HARQ feedback timing (scheduled in subframes #2 and #3), the BS 136 shall shift the corresponding HARQ feedback to another "normal" (e.g., non-QP) subframe, and indicates (block 720) to the UEs with CR ability a sensing instruction which includes an indicator of the new timing where HARQ feedback is shifted. The indicator can be generated in the following two exemplary and non-limiting options as follows:

Option 1 (illustrated by block 705):

When the BS 136 sends a sensing instruction (e.g., sent via Layer 1 signaling over PDCCH or high layer signaling over PDSCH) to the UEs, indicator(s) of offset value(s) should be contained within the instruction, the indicator(s) indicating where HARQ feedback can be shifted from currently scheduled subframe(s). For example, referring to FIG. 6 in addition to FIG. 7, if subframe #2 is used for spectrum sensing, and the HARQ feedback corresponding to DL subframes #4,5,8,6 is shifted from subframe #2 to UL subframe #7 together with a correspondingly adjusted UL grant, the offset value can be characterized by the value of 5, which represents distance between subframe #2 and #7. It is noted that these can be a fixed offset value according to UL subframe number. For example, if UL subframe 2 is used as a QP, the corresponding offset value is 5 for subframe 2. This shift (of offset having a value of 5) is indicated in block 705 by the arrow between subframe 2 and subframe 7 (and by the indication "Offset value 1"). The arrows between subframe 3 and subframes 1,4,5,6 indicate (as shown in FIG. 6) that the HARQ-ACK of subframe #7 can be shifted to one of DL subframes #1 or #4 or #5 or #6. This is also indicated by the indication "Offset value 2" in FIG. 7. It is noted that the BS 136 and the UE 110 have to agree on which of the subframes #1 or #4 or #5 or #6 is to be used for communication of the HARQ feedback.

Option 2 (shown in block 710):

In advance, the BS 136 and the UEs 110 make an agreement on the mapping relationships corresponding to possible HARQ-ACK loss issues. When the BS 136 sends a sensing instruction to UEs 110, the BS 136 only needs to inform the UEs 110 the selected mapping type (e.g., an indication of "Mapping #2", which is one of four exemplary mappings shown), rather than provide offset values, which can save the signaling overhead. The four mappings shown in block 710 correspond to the shifting shown in block 705.

In block 725, the BS 136 takes subframes #2 and #3 for spectrum sensing. That is, the UE 110 performs sensing of the license-exempt frequency spectrum (e.g., unlicensed band(s) or shared band(s)) in the subframes #2 and #3.

Figure 8:
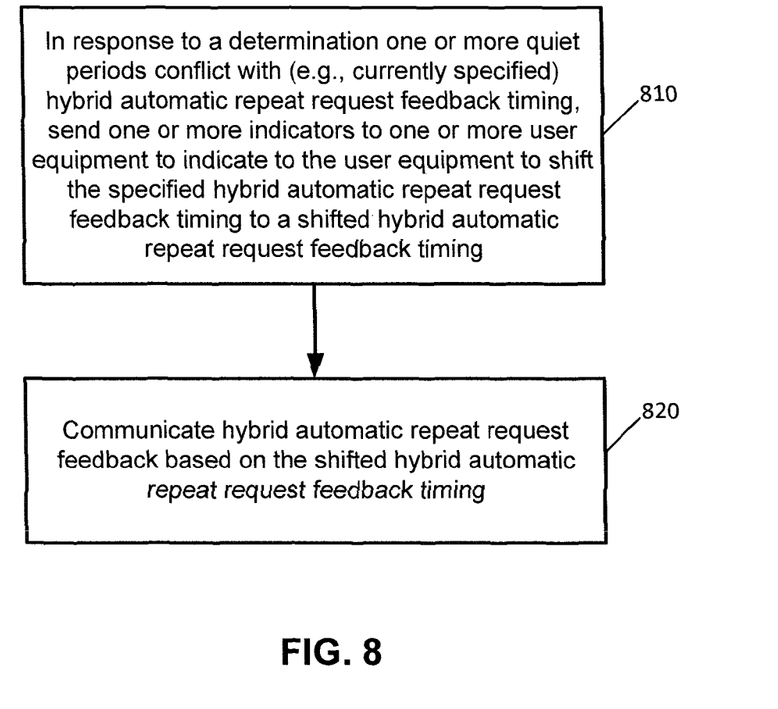
FIG. 8 is a flowchart of an exemplary method performed by a base station for shifting HARQ feedback for cognitive-radio-based TD-LTE systems.

Turning now to FIG. 8, this figure is a flowchart of an exemplary method performed by a base station for shifting HARQ feedback for cognitive-radio-based TD-LTE systems. The method may be performed by computer program code 153 (executed by the one or more processors 150), by hardware such as an integrated circuit, or by some combination of hardware and computer program code. In block 810, the base station 136, in response to a determination one or more quiet periods conflict with currently specified hybrid automatic repeat request feedback timing, sends one or more indicators to one or more user equipment to indicate to the user equipment to shift the currently specified hybrid automatic repeat request feedback timing to a shifted hybrid automatic repeat request timing. In block 820, the base station communicates hybrid automatic repeat request feedback based on the shifted hybrid automatic repeat request timing. For instance, the base station may receive HARQ feedback corresponding to a DL transmission from the UE 110 in an uplink subframe, or may send HARQ feedback corresponding to an UL data transmission to the UE 110 in a downlink subframe.

Figure 9:
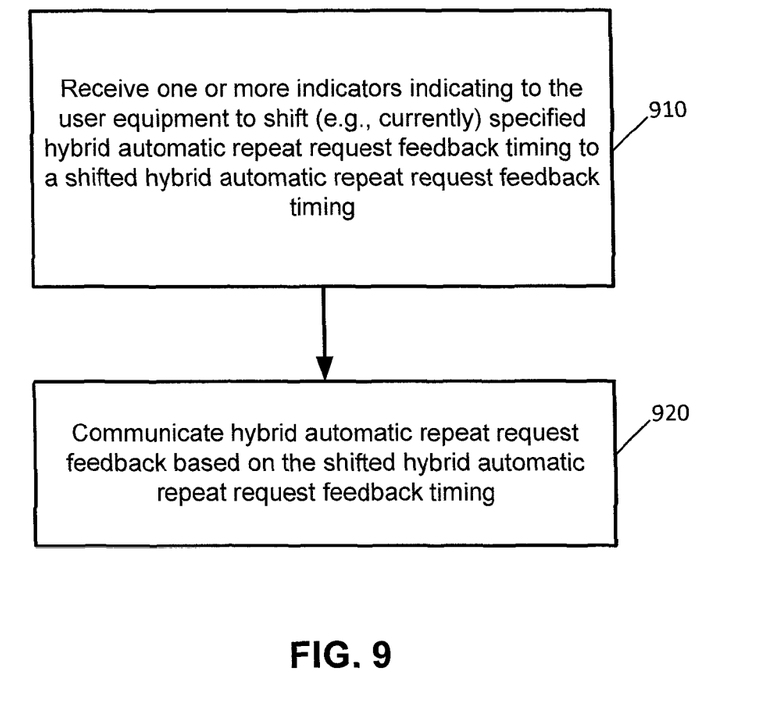
FIG. 9 is a flowchart of an exemplary method performed by a user equipment for shifting HARQ feedback for cognitive-radio-based TD-LTE systems.

Referring now to FIG. 9, a flowchart is shown of an exemplary method performed by a user equipment for shifting HARQ feedback for cognitive-radio-based TD-LTE systems. The method may be performed by computer program code 123 (executed by the one or more processors 120), by hardware such as an integrated circuit, or by some combination of hardware and computer program code. In block 910, the UE 110 receives one or more indicators indicating to the user equipment to shift currently specified hybrid automatic repeat request feedback timing to a shifted hybrid automatic repeat request timing. In block 920, the UE 110 communicates hybrid automatic repeat request feedback based on the shifted hybrid automatic repeat request timing. For instance, the UE 110 may send HARQ feedback to the BS 136 in an uplink subframe, or may receive HARQ feedback from the BS 136 in a downlink subframe.

A technical effect of these teachings is to provide indicators to allow user equipment to determine where to shift HARQ timing in order to reduce HARQ and QP conflicts. A further technical effect is to shift HARQ timing relative to subframes used for QPs.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125, 155 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
one or more processors; and
one or more memories including computer program code, the one or more memories and the computer program code configured to, with the one or more processors, cause the apparatus to perform at least the following:
in response to a determination one or more quiet periods for spectrum sensing conflict with specified hybrid automatic repeat request feedback timing, sending one or more indicators to one or more user equipment to indicate to the user equipment to shift the specified hybrid automatic repeat request feedback timing to a shifted hybrid automatic repeat request feedback timing; and
communicating hybrid automatic repeat request feedback based on the shifted hybrid automatic repeat request feedback timing.

2. The apparatus of claim 1, wherein the one or more indicators indicate one or more offset values from current hybrid automatic repeat request feedback timing, the one or more offset values to be used, along with current hybrid automatic repeat request feedback timing, by the user equipment to determine the shifted hybrid automatic repeat request feedback timing.

3. The apparatus of claim 2, wherein a given one of the one or more offset values is an offset relative to a subframe currently scheduled to be used for hybrid automatic repeat request feedback, and the user equipment is to use the given offset value to offset the subframe to a Previously Presented subframe to be used for hybrid automatic repeat request feedback.

4. The apparatus of claim 2, wherein the one or more offset values is a plurality of offset values, each offset value to be used by the user equipment to offset a subframe currently scheduled to be used for hybrid automatic repeat request feedback to a Previously Presented subframe to be used for hybrid automatic repeat request feedback.

5. The apparatus of claim 1, wherein the one or more indicators comprise an indicator of a mapping type to be used by the user equipment to determine which mapping from a plurality of mappings is to be used to determine the shifted hybrid automatic repeat request timing.

6. The apparatus of claim 5, wherein the each mapping defines one or more changes from one or more subframes currently scheduled to be used for hybrid automatic repeat request feedback to one or more Previously Presented subframes to be used for hybrid automatic repeat request feedback.

7. The apparatus of claim 6, wherein at least one of the mappings defines a plurality of changes, and each of the plurality of changes in the at least one mapping is a change from a subframe currently scheduled to be used for hybrid automatic repeat request feedback to one of the Previously Presented subframes to be used for hybrid automatic repeat request feedback.

8. The apparatus of claim 1, wherein the determination one or more quiet periods conflict with specified hybrid automatic repeat request feedback timing is made in response to a determination one or more uplink or downlink subframes scheduled for hybrid automatic repeat request feedback are to be used for one or more quiet periods wherein network traffic is suspended and at least the user equipment senses one or more unlicensed bands.

9. The apparatus of claim 8, wherein the one or more uplink or downlink subframes specified for hybrid automatic repeat request feedback are used for the one or more quiet periods.

10. A method, comprising:
in response to a determination one or more quiet periods for spectrum sensing conflict with specified hybrid automatic repeat request feedback timing, sending one or more indicators to one or more user equipment to indicate to the user equipment to shift the specified hybrid automatic repeat request feedback timing to a shifted hybrid automatic repeat request feedback timing; and
communicating hybrid automatic repeat request feedback based on the shifted hybrid automatic repeat request feedback timing.

11. An apparatus, comprising:
one or more processors; and
one or more memories including computer program code, the one or more memories and the computer program code configured to, with the one or more processors, cause the apparatus to perform at least the following:
receiving at a user equipment one or more indicators indicating to the user equipment to shift specified hybrid automatic repeat request feedback timing to a shifted hybrid automatic repeat request timing, wherein the one or more indicators are in response to a determination one or more quiet periods for spectrum sensing conflict with the specified hybrid automatic repeat request feedback timing; and
communicating hybrid automatic repeat request feedback based on the shifted hybrid automatic repeat request timing.

12. The apparatus of claim 11, wherein the one or more indicators indicate one more offset values from current hybrid automatic repeat request feedback timing, the one or more offset values used, along with current hybrid automatic repeat request feedback timing, by the user equipment to determine the shifted hybrid automatic repeat request feedback timing.

13. The apparatus of claim 12, wherein a given one of the one or more offset values is an offset relative to a subframe currently scheduled to be used for hybrid automatic repeat request feedback, wherein the one or more memories and the computer program code are further configured to, with the one or more processors, cause the apparatus to use the given offset value to offset the subframe to a Previously Presented subframe to be used for communicating the hybrid automatic repeat request feedback, and wherein the communicating further comprises communicating the hybrid automatic repeat request feedback in the Previously Presented subframe.

14. The apparatus of claim 12, wherein the one or more offset values is a plurality of offset values, each offset value to be used by the user equipment to offset a subframe currently scheduled to be used for hybrid automatic repeat request feedback to a Previously Presented subframe to be used for hybrid automatic repeat request feedback, and wherein the communicating further comprises communicating the hybrid automatic repeat request feedback in the Previously Presented subframes.

15. The apparatus of claim 11, wherein the one or more indicators comprise an indicator of a mapping type to be used by the user equipment to determine which mapping from a plurality of mappings to be used to determine the shifted hybrid automatic repeat request timing, wherein the one or more memories and the computer program code are further configured to, with the one or more processors, cause the apparatus to use the mapping type to select a mapping from the plurality of mappings, and wherein the communicating further comprises communicating the hybrid automatic repeat request feedback based on the selected mapping.

16. The apparatus of claim 15, wherein the each mapping defines one or more changes from a subframe currently scheduled to be used for hybrid automatic repeat request feedback to one or more Previously Presented subframes to be used for hybrid automatic repeat request feedback, and wherein the communicating further comprises communicating the hybrid automatic repeat request feedback in the one or more Previously Presented subframes.

17. The apparatus of claim 16, wherein at least one of the mappings defines a plurality of changes, and each of the plurality of changes in the at least one mapping is a change from a subframe currently scheduled to be used for hybrid automatic repeat request feedback to one of the one or more Previously Presented subframes to be used for hybrid automatic repeat request feedback.

18. The apparatus of claim 11, wherein one or more indicators are received responsive to a determination one or more quiet periods conflict with the specified hybrid automatic repeat request feedback timing, and wherein the user equipment uses one or more uplink or downlink subframes specified for hybrid automatic repeat request feedback for the one or more quiet periods.

19. A method, comprising:
receiving at a user equipment one or more indicators indicating to the user equipment to shift specified hybrid automatic repeat request feedback timing to a shifted hybrid automatic repeat request timing, wherein the one or more indicators are in response to a determination one or more quiet periods for spectrum sensing conflict with the specified hybrid automatic repeat request feedback timing; and
communicating hybrid automatic repeat request feedback based on the shifted hybrid automatic repeat request timing.

20. The method of claim 19, wherein the one or more indicators indicate one or more offset values from current hybrid automatic repeat request feedback timing, the one or more offset values used, along with current hybrid automatic repeat request feedback timing, by the user equipment to determine the shifted hybrid automatic repeat request feedback timing.

* * * * *